Feb. 15, 1927.

R. T. PIERCE 1,617,416

MEANS FOR MEASURING AND CONTROLLING TEMPERATURES

Filed Sept. 19, 1922

WITNESSES:

INVENTOR
Raymond T. Pierce.
BY
ATTORNEY

Patented Feb. 15, 1927.

1,617,416

UNITED STATES PATENT OFFICE.

RAYMOND T. PIERCE, OF WILKINSBURG, PENNSYLVANIA, ASSIGNOR TO WESTINGHOUSE ELECTRIC & MANUFACTURING COMPANY, A CORPORATION OF PENNSYLVANIA.

MEANS FOR MEASURING AND CONTROLLING TEMPERATURES.

Application filed September 19, 1922. Serial No. 589,089.

My invention relates to pyrometer systems and particularly to compensating pyrometer systems and apparatus employed therein.

One object of my invention is to provide a novel system whereby temperatures may be measured by the electromotive force generated in a heated thermocouple and compensations automatically effected for variations in the temperature of the cold junction of the couple.

Another object of my invention is to provide a pyrometer system, of the above-indicated character, in which the departure of the temperature of the cold junction of the couple from a predetermined temperature is measured and the thermal electromotive force that is generated in the couple is modified to establish an effective electromotive force that is proportional to the temperature of the hot junction of the couple.

Another object of my invention is to provide a system of the above-indicated character that shall be simple in construction, easy to calibrate and reliable and accurate in its operation.

When measuring temperatures by means of a thermocouple, it is necessary to maintain the temperature of the cold junction constant or to compensate for variations in such temperature, since the thermal electromotive force that is generated in the thermocouple is proportional to the difference in temperature between the hot and the cold junctions rather than to the temperature of the hot junction itself.

In practicing my invention, I provide a relatively sensitive instrument to measure the thermal electromotive force generated in a couple that is subjected to the temperature that is to be measured. In order to compensate for variations in the temperature of the cold junction of the thermocouple, I provide means, comprising a Wheatstone bridge, for measuring the departure of the temperature of the cold junction from a predetermined temperature and then modify the generated electromotive force of the thermocouple by an auxiliary force that is proportional to such departure. The resultant effective electromotive force available to energize the instrument is proportional to the temperature of the hot junction of the thermocouple.

Figure 1:
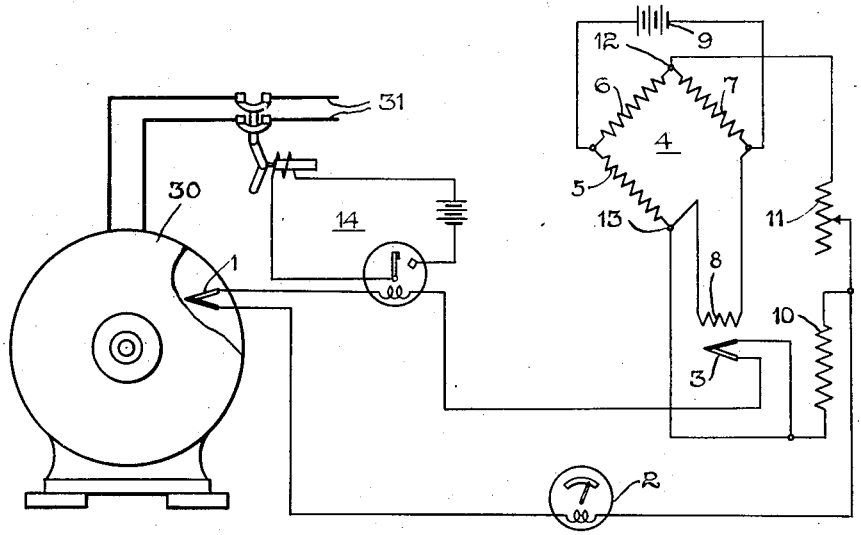
Figure 2:
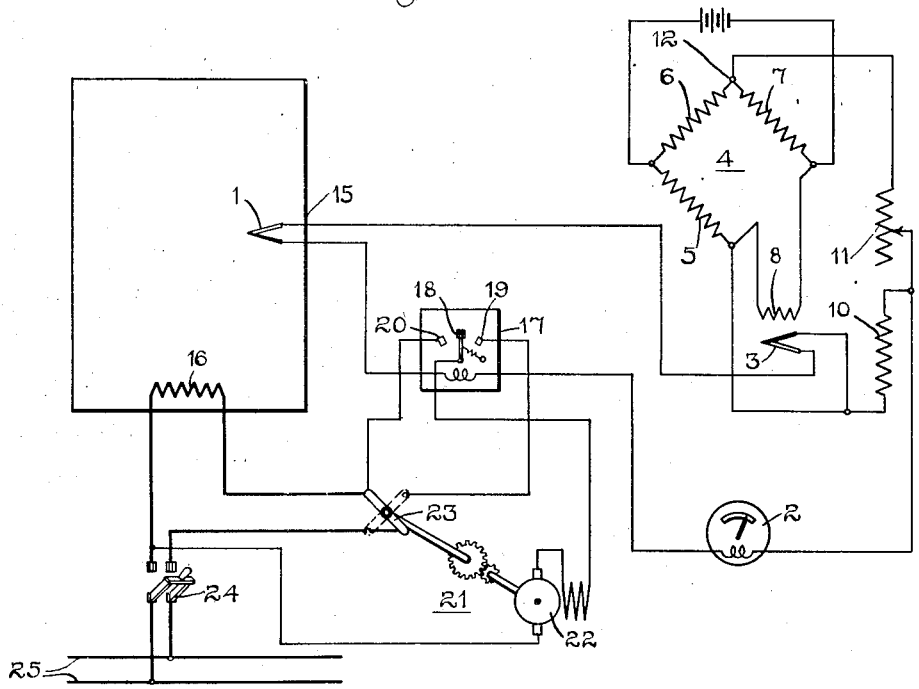

Figure 1 of the drawings is a diagrammatic view of an electrical circuit illustrating a pyrometer system embodying my invention, and Fig. 2 is a diagrammatic view of a furnace-control system to which has been applied the system illustrated in Fig. 1.

The system that is illustrated in Fig. 1 comprises, in general, a thermocouple 1, that is subjected to the temperature to be measured or controlled, and indicating measuring instrument 2, a cold junction 3 and a measuring device 4 for measuring the temperature of the cold junction and for compensating for the electromotive force impressed upon the measuring instrument 2 in accordance with the value of such temperature.

The measuring device 4 comprises four resistors 5, 6, 7 and 8 that are arranged to compose a Wheatstone bridge. The resistors 5, 6 and 7 are preferably made of material having a negligible or zero temperature coefficient of resistance, and the resistor 8 is preferably made of some material, such as copper, having a substantially straight-line temperature-resistance curve.

The bridge, comprising the resistor elements, is energized from a source 9 of electrical energy. Instead of a galvanometer, the usual galvanometer circuit is provided including a resistor 10, having a predetermined known resistance and a negligible or zero temperature coefficient of resistance, and a variable resistor 11.

The resistor 8 is thermally associated with the cold junction 3 and is arranged to be subjected to the same temperature. At a predetermined temperature, the resistors 5, 6, 7 and 8 all have the same value of resistance and the Wheatstone bridge composed thereby is therefore balanced. Under such conditions, there is no potential difference between the junctions 12 and 13 of the bridge to which the galvanometer circuit, including the resistors 10 and 11, is connected.

As the temperature of the cold junction 3 and the resistor 8 varies, however, and departs from such predetermined temperature, the value of the resistor 8 changes and unbalances the Wheatstone bridge. A potential difference is, therefore, established between the points 12 and 13 of the bridge that is proportional to the departure of the cold-junction temperature from the predetermined temperature.

The potential difference across the terminals of the known resistor 10 is a function of the potential difference between the points 12 and 13 and is, therefore, proportional to the departure of the temperature of the cold junction from the predetermined temperature.

By properly modifying the thermal electromotive force generated in the thermocouple 1, in accordance with the potential difference across the terminals of the resistor 10, variations in the temperature of the cold junction may be effectively compensated. Thus, if the temperature of the cold junction should increase above the predetermined value, the potential difference across the resistor 10 would be added to the thermal electromotive force generated by the difference in temperature between the hot junction 1 and the cold junction 3 to indicate accurately the actual temperature of the hot junction of the couple. Similarly, if the temperature of the cold junction should decrease to a value less than the predetermined temperature, the potential difference across the resistor would be subtracted from the electromotive force generated by the difference in temperature between the cold and the hot junctions of the couple.

By thus adding to, or subtracting from, the electromotive force generated by the difference in temperature between the cold and the hot junctions of the couple, a value proportional to the temperature of the cold junction, a resultant electromotive force may be obtained that is a direct indication of the true temperature of the hot thermocouple junction 1.

The resistor elements of the bridge may be designed to establish a condition of balance therein at a predetermined temperature of the cold junction, which may be the average temperature of the ambient air. The bridge will then measure the departure of such temperature from the predetermined temperature and compensate for such departure. Under such conditions, the bridge will also be affected less by variations in the control voltage.

A curve showing the relation between the difference in temperature of the hot and the cold junctions of a thermocouple to the thermal electromotive force that is generated therein is substantially a straight line up to approximately 2000° Fah. Similarly, the temperature-resistance curve of the resistor 8, which may be of copper, is a straight line.

The function of the variable resistor 11 is to change the slope of the temperature-resistance curve of the resistor 8 to cause it to correspond to the slope showing the relation between the thermocouple temperature and the electromotive force generated thereby. That is, the potential difference established across the resistor 10, upon a departure of the temperature of the resistor 8, one degree from the predetermined temperature, is equal to the thermal electromotive force generated in the couple at a temperature difference of one degree between the hot and the cold junction.

After the resistor 11 is once adjusted to establish the proper relations in its circuit, the connection may be made permanent. When it is possible that the indication of the instrument 2 may be somewhat affected by an increase in the temperature of the operating windings, the resistors 8 and 10 may be arranged to provide a slight overcompensation to compensate for the decreased sensitivity of the instrument.

A protective relay 14 is connected in the thermocouple circuit and may be adjusted to operate at a predetermined value of current corresponding to the temperature of the hot junction of the couple. The relay is arranged to disconnect a translating apparatus, such as a generator 30, from an electric circuit 31 when the temperature of the apparatus attains or exceeds a predetermined value.

In Fig. 2, the system is illustrated as applied to the automatic control of an electric furnace 15. The furnace 15 is provided with a heating resistor 16, and the thermocouple is disposed in the furnace to be subjected to the temperature of a predetermined portion or spot of the furnace.

A control relay 17 is connected in circuit with the thermocouple 1 to be energized therefrom in accordance with the temperature of the furnace. When the furnace is cold or the temperature thereof is below a predetermined value, a movable contact member 18 engages a stationary contact member 19, and, when the furnace is heated to a predetermined degree, the relay device 17 is energized to effect engagement of the movable contact member 18 with a second stationary contact member 20. A motor-operated snap switch 21, comprising a motor 22 and a snap switch 23, is provided to control the energization of the heating element 16. A manually-operated switch 24 is provided to connect the furnace and automatic control system to a source of electrical energy 25.

When the furnace is cold and the switch 24 is open, the contact members 18 and 19 are engaged and the switch 23 is in the dotted-line position. Upon the closing of the switch 24, the motor 22 is energized through the contact members 18 and 19 and the switch 23 (dotted-line position), and the motor is energized to actuate the switch 23 to the full-line position that is illustrated.

The heating element 16 is thereupon connected to the circuit to be energized therefrom and the furnace is heated.

When the temperature of the furnace increases to a predetermined value corresponding to the relative positions of the contact members 19 and 20 and the extent of movement of the contact member 18, the contact members 18 and 20 will engage to complete the circuit for energizing the motor 22 which is thereupon energized to actuate the snap switch 23 to its initial position. The heater 16 is thereupon disconnected from the circuit, and the temperature of the furnace decreases until the contact members 18 and 19 re-engage. The heating cycle just described is then continued.

I have illustrated merely schematically one form of temperature control system to show the application thereto of the pyrometer system embodying my invention. Various changes may be made in the arrangement of the various devices without departing from the spirit and scope of my invention, as set forth in the appended claims.

I claim as my invention:

1. A temperature-measuring instrument comprising a Wheatstone-bridge circuit, means comprising a resistor connected between the galvanometer points of the bridge and a thermocouple circuit connected across the terminals of the resistor.

2. A temperature-measuring instrument comprising a Wheatstone-bridge circuit, means comprising a resistor connected between the galvanometer points of the bridge and a thermocouple circuit comprising a current-responsive device connected across the terminals of the resistor.

3. A temperature-measuring instrument comprising a Wheatstone-bridge circuit embodying three arms of resistors having negligible temperature-resistance coefficients and one arm of resistance having a predetermined temperature-resistance coefficient, means connected between the galvanometer points of the bridge comprising a fixed and a variable resistor, and a thermocouple circuit containing a thermocouple the cold junction of which is maintained at substantially the same temperature as the one arm of the bridge having the temperature-resistance coefficient.

4. A temperature-measuring instrument comprising a Wheatstone-bridge circuit, a circuit comprising a resistor connected to the bridge to be energized therefrom in accordance with the degree of unbalance of the bridge, a thermocouple circuit containing a thermocouple connected across the resistor and means responsive to the temperature of the cold junction of the thermocouple for controlling the unbalancing of the bridge.

5. A pyrometer comprising a thermocouple circuit containing a hot and cold junction of the couple and a current-responsive device, and means for compensating for variations in the temperature of the cold junction comprising a Wheatstone bridge and a resistor common to the galvanometer circuit of the bridge and to the thermocouple circuit.

6. A pyrometer comprising a thermocouple circuit containing a hot and a cold junction of the couple and a current-responsive device, and means for compensating for variations in the temperature of the cold junction comprising a resistor and means for impressing a potential difference thereacross in proportion to the amount of variation of the temperature of the cold junction from a predetermined temperature.

7. A pyrometer comprising a thermocouple circuit containing a hot and a cold junction of the couple and a current-responsive device, and means for compensating for variations in the temperature of the cold junction comprising a source of electromotive force a resistor and a Wheatstone bridge for impressing a potential difference thereacross in proportion to the amount of variation of the temperature of the cold junction from a predetermined temperature.

8. A pyrometer comprising a thermocouple circuit containing a hot and a cold junction of the couple and a current-responsive device, and means for compensating for variations in the temperature of the cold junction comprising a resistor connected in electric circuit with said thermocouple and temperature-responsive means connected in electric circuit with said thermocouple, for impressing a potential difference thereacross in proportion to the amount of variation of the temperature of the cold junction from a predetermined temperature.

9. In a pyrometer embodying a thermocouple circuit, the method of compensating for the departure from correct measurement of the temperature of the hot junction of the couple caused by variations of the temperature of the cold junction from a predetermined temperature which consists in introducing into the thermocouple circuit a potential difference proportional to the departure of the cold-junction temperature from the predetermined temperature and in a direction relative to the electromotive force of the thermocouple to establish a resultant electromotive force in the couple circuit directly proportional to the actual temperature of the hot junction of the couple.

10. A pyrometer comprising a thermocouple circuit including a thermocouple having a hot and a cold junction, a measuring instrument and a resistor, and means for compensating for changes in the temperature of the cold junction comprising a resistor having a temperature coefficient and subjected to the temperature of the cold junction to be directly influenced thereby, and a measuring device for measuring the change effected in the resistance of the resistor associated with the cold junction and operative to establish a potential difference across the resistor in the thermocouple circuit proportional to the departure of the cold-junction temperature from a predetermined temperature.

11. A pyrometer comprising a plurality of resistors arranged to constitute a Wheatstone bridge, a circuit including a thermocouple, a current-responsive device and a resistor, and means for connecting the terminals of the resistor to balance points of the bridge.

12. A pyrometer comprising a thermocouple circuit containing the hot and the cold junctions of a thermocouple and a measuring instrument, and means for compensating for variations in the thermal electromotive force generated by the couple, by reason of the departure of the temperature of the cold junction from a predetermined value, comprising means whose temperature varies in accordance with the departure of the temperature of the cold-junction from the predetermined value.

In testimony whereof, I have hereunto subscribed my name this 15th day of September, 1922.

RAYMOND T. PIERCE.